United States Patent
Koziorowski et al.

(10) Patent No.: US 12,274,286 B2
(45) Date of Patent: Apr. 15, 2025

(54) DRUM ROASTER FOR ROASTING BEANS

(71) Applicant: PROBAT-WERKE VON GIMBORN MASCHINENFABRIK GMBH, Emmerich (DE)

(72) Inventors: Thomas Koziorowski, Muelheim an der Ruhr (DE); Kai Denecke, Emmerich (DE)

(73) Assignee: PROBAT-WERKE VON GIMBORN MASCHINENFABRIK GMBH, Emmerich (DE)

( * ) Notice: Subject to any disclaimer, the term of this patent is extended or adjusted under 35 U.S.C. 154(b) by 335 days.

(21) Appl. No.: 17/792,709

(22) PCT Filed: Jan. 12, 2021

(86) PCT No.: PCT/EP2021/050431
§ 371 (c)(1),
(2) Date: Jul. 14, 2022

(87) PCT Pub. No.: WO2021/144239
PCT Pub. Date: Jul. 22, 2021

(65) Prior Publication Data
US 2023/0049983 A1    Feb. 16, 2023

(30) Foreign Application Priority Data
Jan. 16, 2020 (DE) .................... 10 2020 100 949.6

(51) Int. Cl.
*A23N 12/10* (2006.01)

(52) U.S. Cl.
CPC .................................. *A23N 12/10* (2013.01)

(58) Field of Classification Search
CPC ......... A23N 12/10; A23N 12/125; A23F 5/04; F26B 3/04; F26B 11/02; F26B 9/082;
(Continued)

(56) References Cited

U.S. PATENT DOCUMENTS 2,360,838 A * 10/1944 Atti ........................ A23N 12/10
99/476
4,860,461 A * 8/1989 Tamaki ................... A23N 12/10
34/267
(Continued)

FOREIGN PATENT DOCUMENTS

CN     204158221 U     2/2015
DE     202008011577 U1 * 12/2008 ............. A23N 12/10
(Continued)

*Primary Examiner* — Gregory A Wilson
(74) *Attorney, Agent, or Firm* — Norman B. Thot

(57) ABSTRACT

A drum roaster for roasting beans. The drum roaster includes a housing arrangement having as operating elements at least a bean inlet arrangement and a bean outlet arrangement, a roasting drum for receiving the beans, a drive device which rotates the roasting drum, a heating device which heats the beans, and an insulation element which provides a thermal insulation. At least the bean outlet arrangement is arranged at a front side of the housing arrangement. The roasting drum is rotatably mounted in the housing arrangement. The insulation element is arranged at the front side in a region of the bean outlet arrangement.

12 Claims, 4 Drawing Sheets

(58) Field of Classification Search
CPC .... F26B 17/1433; F26B 25/04; F26B 11/181; F26B 25/06
See application file for complete search history.

(56) References Cited

U.S. PATENT DOCUMENTS

| | | | | |
|---|---|---|---|---|
| 4,958,443 | A * | 9/1990 | Haueter | F26B 3/343 |
| | | | | 34/130 |
| 7,003,897 | B1 * | 2/2006 | Lingle | A23N 12/083 |
| | | | | 34/108 |
| 10,555,549 | B2 * | 2/2020 | Chang | B01F 29/253 |
| 2017/0011304 | A1 | 1/2017 | Shimizu | |

FOREIGN PATENT DOCUMENTS

| | | |
|---|---|---|
| DE | 20 2015 100 090 U1 | 5/2015 |
| EP | 0 328 791 A2 | 8/1989 |
| FR | 2 791 227 A1 | 9/2000 |
| JP | 3198621 U | 7/2015 |
| KR | 20140109598 A * | 9/2014 |
| KR | 20200110835 A * | 9/2020 |
| WO | WO 2011/136632 A2 | 11/2011 |

* cited by examiner

DRUM ROASTER FOR ROASTING BEANS

CROSS REFERENCE TO PRIOR APPLICATIONS

This application is a U.S. National Phase application under 35 U.S.C. § 371 of International Application No. PCT/EP2021/050431, filed on Jan. 12, 2021 and which claims benefit to German Patent Application No. 10 2020 100 949.6, filed on Jan. 16, 2020. The International Application was published in German on Jul. 22, 2021 as WO 2021/144239 A1 under PCT Article 21(2).

FIELD

The present invention relates to a drum roaster for roasting beans, such as coffee beans, with a housing arrangement in which a roasting drum for receiving the beans is rotatably mounted, wherein a drive device for rotating the roasting drum and a heating device for heating the beans are provided, wherein the housing arrangement comprises as operating elements at least one bean inlet arrangement and one bean outlet arrangement, wherein at least the bean outlet arrangement is provided on a front side of the housing arrangement.

BACKGROUND

Such drum roasters have previously been described and are in particular used as so-called small roasters, shop roasters or shop roasters in smaller roasting plants or shops or cafés. These drum roasters are placed in sales rooms or in freely accessible areas because of their appealing design and pleasant roasting aroma. An example of such a drum roaster is described in the German utility model application DE 20 2015 100 90 U1. The drum roaster is here operated by operating personnel or viewed by guests from the front of the drum roaster. The roasting drum for receiving the beans, which is rotatably mounted inside the housing arrangement, is heated up to 250° C. during the roasting process by use of a suitable heating device, such as an electric or gas heater. The front side near the bean outlet arrangement can in particular heat up to such an extent that it can cause injuries to the operating personnel or even to guests. Because of design reasons, the front side of the housing arrangement is made of cast iron to provide the drum roaster with a nostalgic charm. This material is known to have a high heat capacity which can cause the front side to heat up very strongly and additionally increase the risk of injury.

SUMMARY

An aspect of the present invention is therefore to avoid the above-mentioned disadvantage in a simple and cost-effective way without unnecessarily increasing installation space.

In an embodiment, the present invention provides a drum roaster for roasting beans. The drum roaster includes a housing arrangement comprising as operating elements at least a bean inlet arrangement and a bean outlet arrangement, a roasting drum for receiving the beans, a drive device which is configured to rotate the roasting drum, a heating device which is configured to heat the beans, and an insulation element which is configured to provide a thermal insulation. At least the bean outlet arrangement is arranged at a front side of the housing arrangement. The roasting drum is rotatably mounted in the housing arrangement. The insulation element is arranged at the front side in a region of the bean outlet arrangement. The drum roaster of the present invention provides protection for operating personnel and also for guests from injury in the case of contact with the front side in a particularly simple and cost-effective manner.

BRIEF DESCRIPTION OF THE DRAWINGS

The present invention is described in greater detail below on the basis of embodiments and of the drawings in which.

DETAILED DESCRIPTION

In a particularly advantageous embodiment, the insulation element has a cavity arrangement. The front side can in this case consist at least partially of a cover part on which the cavity arrangement is arranged. A particularly simple assembly of the drum roaster is provided by the fact that, in the cover part, a bean outlet opening of the bean outlet arrangement is provided with a rotatably mounted closure flap element. In a particularly advantageous way, and supporting the design of a drum roaster, the cavity arrangement is essentially disc-shaped. The cavity arrangement can in this case comprise two partial ring elements on which a plate element is arranged.

In a particularly advantageous manner, further operating elements, such as the bean inlet arrangement, a sample extractor arrangement, and a viewing window arrangement, are provided at least partially in the cavity arrangement. This provides a simple manner of avoiding burn injuries when operating the machine or by simply touching the operating elements.

In a particularly simple and thus cost-effective manner, the bean inlet and bean outlet arrangements are provided by forming opening areas of the bean inlet and bean outlet arrangements by the partial ring elements. The cavity arrangement can be filled with air to provide thermal insulation. It is alternatively also possible to fill the cavity arrangement with an insulating material, such as with an insulator.

To further reduce heat input to the front side, a sheet metal part surrounding the roasting drum which is spaced from the front side can advantageously be provided in the housing arrangement.

An insulated exhaust air pipe or duct can also be provided in the housing assembly which provides a particularly compact drum roaster that also makes injury to a hot, external exhaust pipe impossible.

In a particularly advantageous manner, the housing arrangement comprises a roasting drum space for the roasting drum and a drive space for at least the drive device, wherein the roasting drum space and the drive space are separated from each other by a wall member with an insulating material. This provides for efficient heat storage in the roasting drum chamber in a simple manner. Electronics in the drive chamber are also protected against overheating.

The present invention is explained in greater detail below under reference to the drawings.

Figure 1:
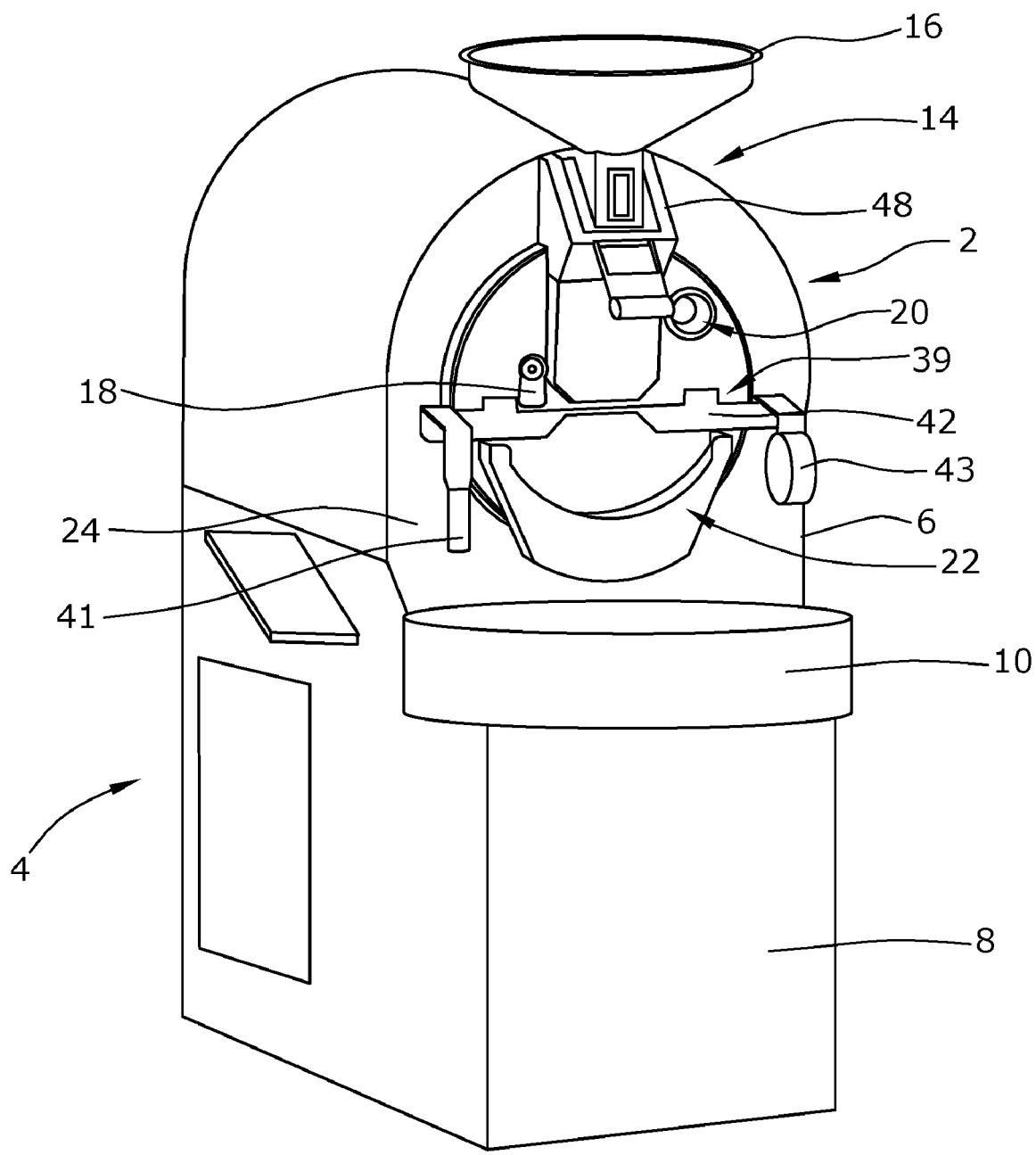
FIG. 1 is a perspective front view of a drum roaster according to the present invention.

FIG. 1 shows a typical drum roaster 2 as a shop roaster. The drum roaster 2 has a housing arrangement 4 which essentially comprises a drum housing part 6 and a base housing part 8. The drum housing part 6 is placed on the base housing part 8, whereby the base housing part 8 comprises a collection vessel 10 for roasted beans. A roasting drum 12 (see FIG. 2) is provided in a known manner in the housing arrangement 4, as well as a drive device 62 (see FIG. 4) for rotating the roasting drum 12 and a heating device (which is not shown further) for heating the beans located in the roasting drum 12. A bean inlet arrangement 14 with a bean inlet hopper 16, a sample extractor arrangement 18, a viewing window arrangement 20, and a bean outlet arrangement 22, which also includes the collection vessel 10, are also shown in the view. All of the operating elements 14, 18, 20, 22 are at least partially arranged on a front side 24 of the drum roaster 2 here shown.

Figure 2:
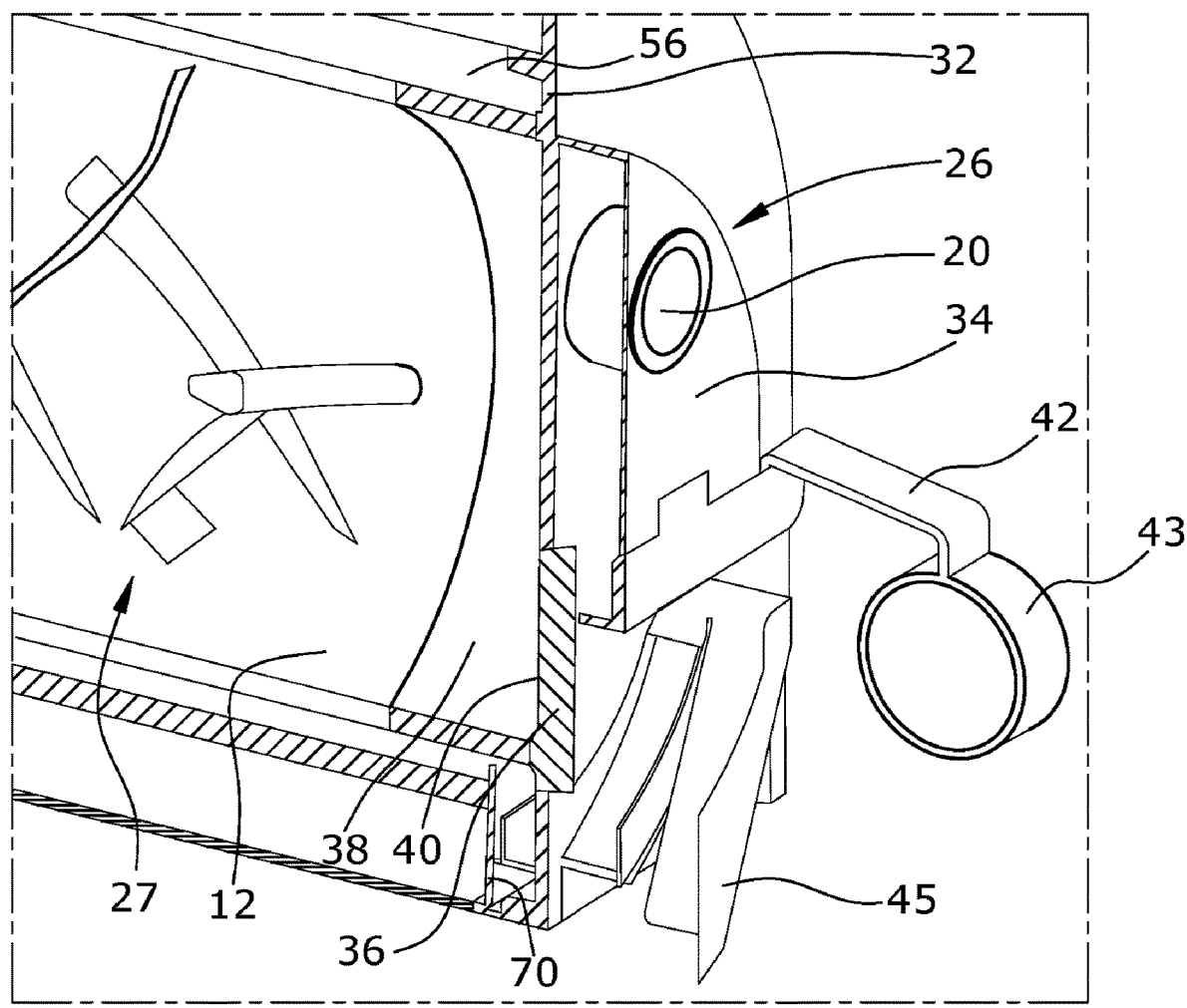
FIG. 2 is a perspective sectional view of a housing arrangement of the drum roaster of FIG. 1.

In order to avoid injuries due to burns in the area of the roasting drum 12, a cavity arrangement 26 is provided on the front side 24 as an insulation element, as shown in FIG. 2. The roasting drum 12 is here designed as a closed roasting drum 12 in which the heat is transferred to beans located in the roasting drum 12 by convection during the roasting process. A vane mechanism 27 is furthermore shown that mixes the beans during the roasting process. The cavity arrangement 26 essentially comprises two partial ring elements 28, 30 (see FIG. 3) which are arranged on a cover part 32, wherein the cavity arrangement 26 is closed by a plate element 34 which is placed on the partial ring elements 28, 30. The cavity arrangement 26 is thereby essentially disc-shaped. The viewing window arrangement 20 and a part of a closure flap element 36 of the bean outlet arrangement 22 are also shown as operating elements in FIG. 2, which closes a roasting drum interior 38 of the drum housing part 6 during the roasting process. The closure flap element 36 is rotatably mounted on the cover part 32 and can be operated via a lever arrangement 39 for this purpose. In order to fill the bean into the collection vessel 10 after completing the roasting process, the lever arrangement 39 is pivoted and releases an opening 40 in the cover part 32. The lever arrangement 39 consists essentially of a handle element 41 and a counterweight 43 connected thereto via a coupling element 42, wherein the counterweight 43 securely closes the closure flap element 36 during the roasting process. The beans pass through an opening area 44 (see FIG. 3) into the bean collection vessel 10. FIG. 2 also shows a cover element 45 which covers the opening area 44.

Figure 3:
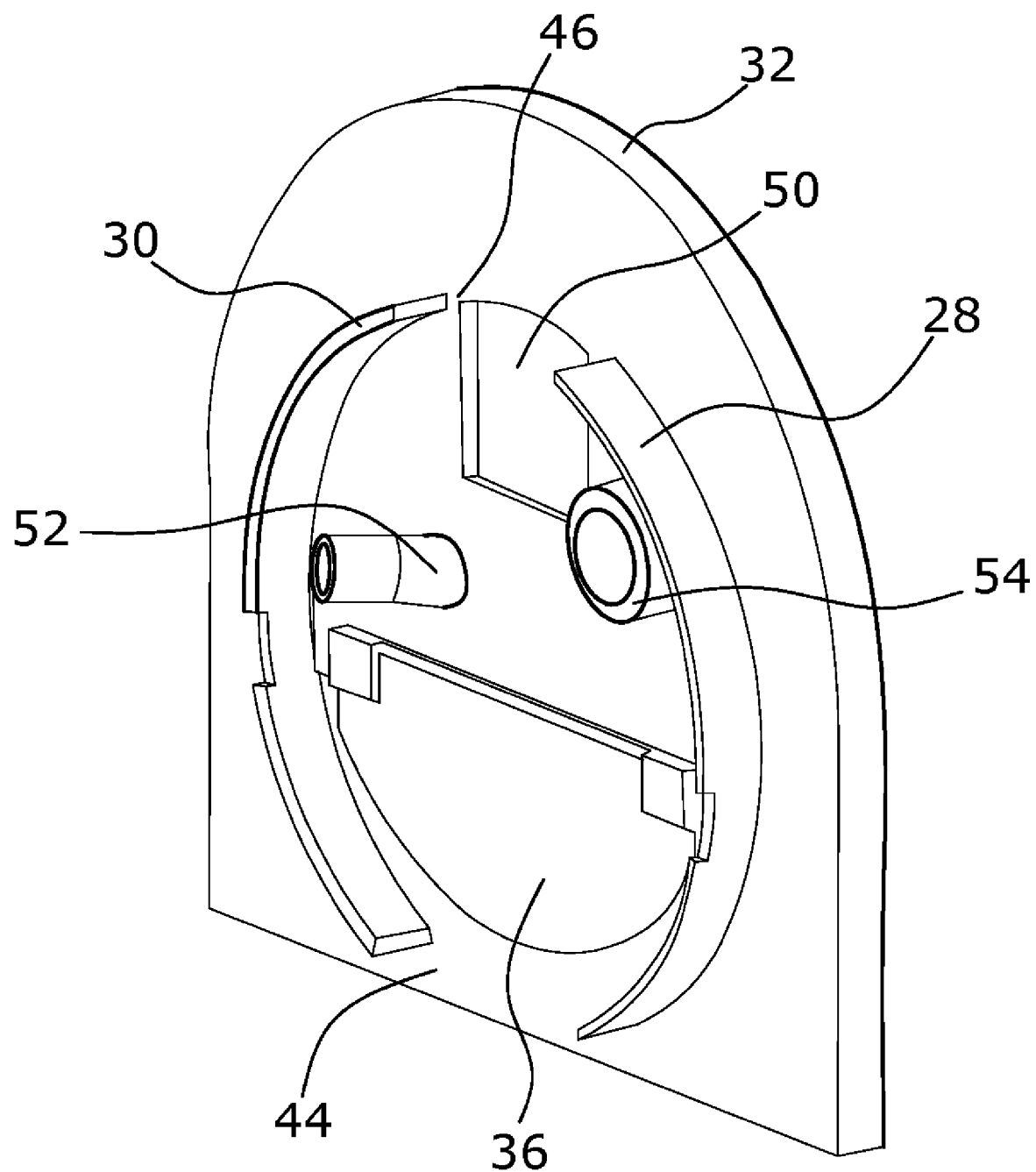
FIG. 3 is a perspective front view of a cover part of the housing arrangement of FIG. 2.

FIG. 3 shows a perspective view of the cover part 32. The arrangement of the two partial ring elements 28 and 30, which form the opening area 44 of the bean outlet arrangement 22 in the lower area and form an opening area 46 of the bean inlet arrangement 14 in the upper area, is clearly visible. The opening area 46 is part of the bean inlet arrangement 14, like the bean inlet hopper 16 and an inlet element 48 (see FIG. 1), through which the beans are guided into the roasting drum interior 38 via an inlet opening 50. This illustration also shows the closure flap element 36, a guide element 52 of the sample extractor arrangement 18, and a conical viewing tunnel 54 of the viewing window arrangement 20.

Figure 4:
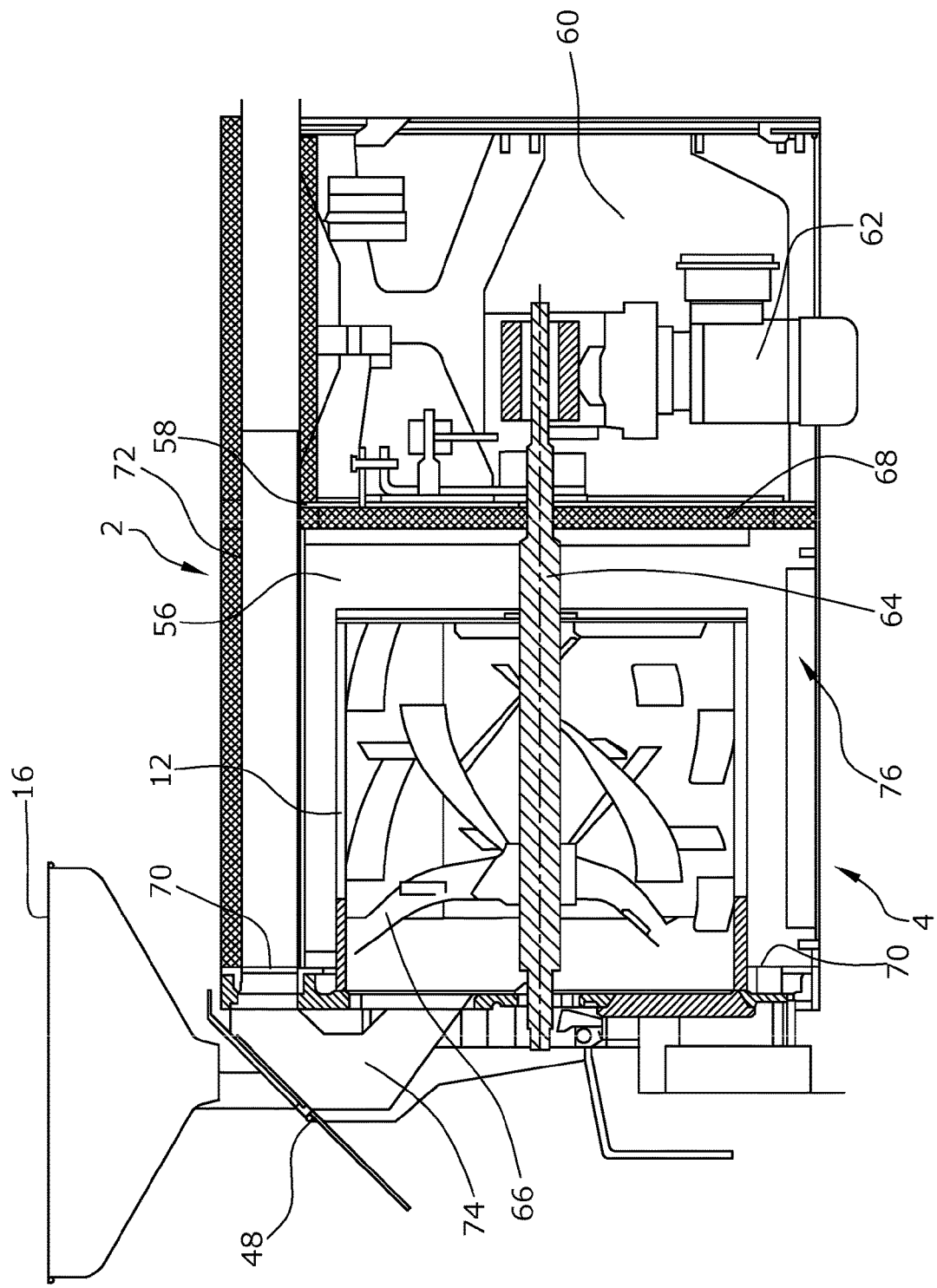
FIG. 4 a sectional view of the drum roaster of FIG. 1 without the base housing part.

FIG. 4 shows a sectional view of the drum roaster 2 without the base housing part 8. It can here be clearly seen that a roasting drum chamber 56 is provided for the roasting drum 12 and a drive chamber 60, separated from the rousting drum chamber 56 by a wall member 58, is provided for, among other things, a drive device 62. The drive device 62 interacts in a known manner with a drive shaft 64, which by itself is rigidly connected to the roasting drum 12 via articulated arms 66. In order to minimize heat loss in the roasting drum chamber 56, an insulating material 68, such as insulator, is arranged in the wall member 58, which is essentially constructed from two plate-shaped elements.

As already indicated in FIG. 2, but which is here clearly visible, a metal sheet 70 is provided in the housing arrangement 4. The metal sheet 70 arranging at a distance of about 25 mm from the front side 24 and surrounding the roasting drum 12 acts as an additional heat shield with respect to the front side 24.

In order to provide a particularly compact, protected drum roaster 2, an exhaust air pipe 72 is provided in the roasting drum chamber 56 and in the drive chamber 60 parallel to the roasting drum 12 and insulated from an outer side and the drive chamber 60, wherein the exhaust air pipe 72 is in fluidic communication via an inner region 74 of the inlet element 48 of the roasting drum 12.

For the purposes of completeness, it should be noted that reference sign 76 merely schematically comprises a region of an associated heating device, which can be designed in a wide variety of ways in a known manner.

The present invention is not limited to embodiments described herein; reference should be had to the appended claims.

LIST OF REFERENCE NUMERALS

2 Drum roaster
4 Housing arrangement
6 Drum housing part
8 Base housing part
10 Collection vessel
12 Roasting drum
14 Bean inlet arrangement
16 Bean inlet hopper/Funnel
18 Sample extractor arrangement
20 Viewing window arrangement
22 Bean outlet arrangement
24 Front side
26 Cavity arrangement
27 Vane mechanism
28 Partial ring element
30 Partial ring element
32 Cover part
34 Plate element
36 Closure flap element
38 Roasting drum interior
39 Lever arrangement
40 Opening
41 Handle element
42 Coupling element
43 Counterweight
44 Opening area
45 Cover element
46 Opening area
48 Inlet element
50 Inlet opening
52 Guide element
54 Conical viewing tunnel
56 Roasting drum chamber
58 Wall member
60 Drive chamber
62 Drive device
64 Drive shaft
66 Articulated arms
68 Insulating material
70 Metal sheet
72 Exhaust air pipe 74 Inner region
76 Region of an associated heating device

What is claimed is:

1. A drum roaster for roasting beans, the drum roaster comprising:
 a housing arrangement comprising as operating elements at least a bean inlet arrangement and a bean outlet arrangement each of which are arranged at a front side of the housing arrangement;
 a roasting drum for receiving the beans, the roasting drum being rotatably mounted in the housing arrangement;
 a drive device which is configured to rotate the roasting drum;
 a heating device which is configured to heat the beans; and
 an insulation element which is configured to provide a thermal insulation, the insulation element being arranged at the front side in a region of the bean outlet arrangement, the insulation element comprising a cavity arrangement,
 wherein,
 the front side comprises a cover part on which the cavity arrangement is arranged, the cover part comprising a bean outlet opening in which is arranged a rotatably mounted closure flap element.

2. The drum roaster as recited in claim 1, wherein the cavity arrangement is substantially disc-shaped.

3. The drum roaster as recited in claim 2, wherein the cavity arrangement comprises two partial ring elements and a plate element which is arranged on the two partial ring elements.

4. The drum roaster as recited in claim 3, wherein the cavity arrangement at least partially comprises further operating elements.

5. The drum roaster as recited in claim 4, wherein the further operating elements include the bean inlet arrangement, a sample extractor arrangement, and a viewing window arrangement.

6. The drum roaster as recited in claim 4, wherein the bean inlet arrangement and the bean outlet arrangement each comprise an opening which is formed by the partial ring elements.

7. The drum roaster as recited in claim 1, wherein the cavity arrangement is filled with air.

8. The drum roaster as recited in claim 1, wherein the cavity arrangement is filled with an insulating material.

9. The drum roaster as recited in claim 8, wherein the insulating material is an insulator.

10. The drum roaster as recited in claim 1, further comprising:
 a metal sheet which is configured to surround the roasting drum, the metal sheet being arranged in the housing arrangement and spaced from the front side.

11. The drum roaster as recited in claim 1, further comprising:
 an insulated exhaust air pipe or an insulated exhaust air duct arranged in the housing arrangement.

12. The drum roaster as recited in claim 1, wherein the housing arrangement further comprises,
 a roasting drum chamber for the roasting drum,
 a drive chamber for at least the drive device, and
 a wall member comprising an insulating material, and
 the roasting drum chamber and the drive chamber are separated from each other by the wall member.

* * * * *